Nov. 1, 1955 E. C. KIEKHAEFER 2,722,304
COOLING MEANS FOR CENTRIFUGAL CLUTCH UNIT
Filed Aug. 4, 1952
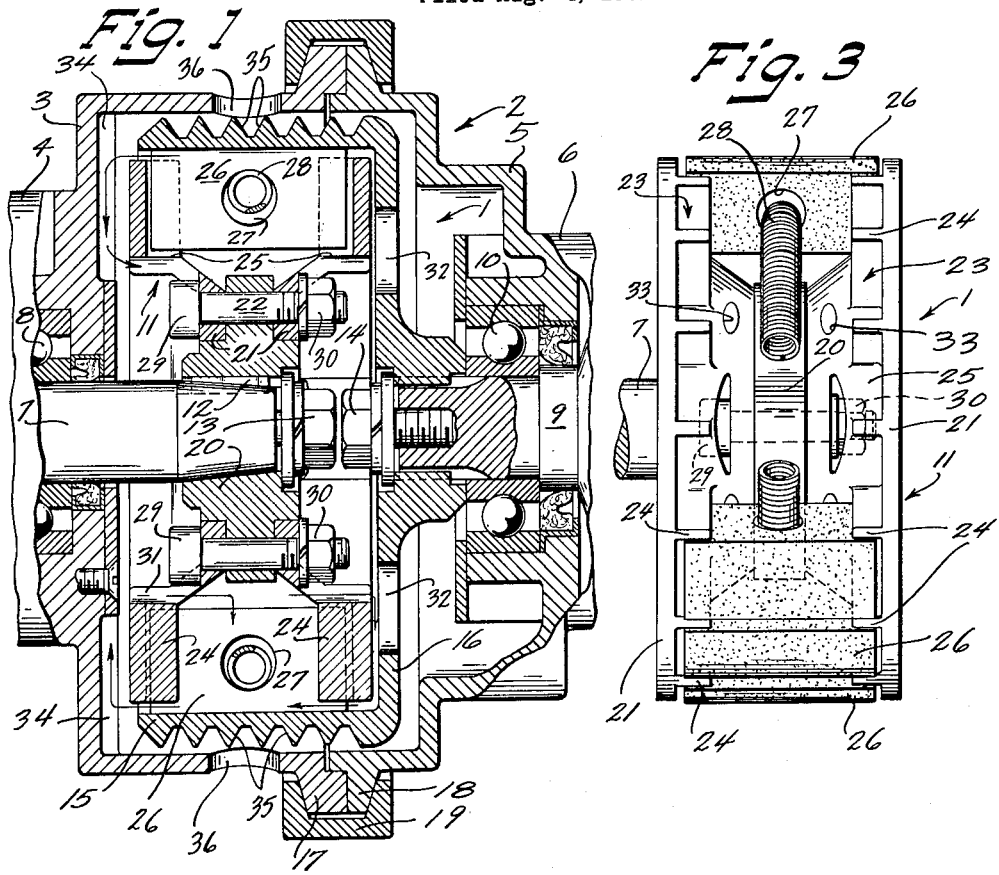
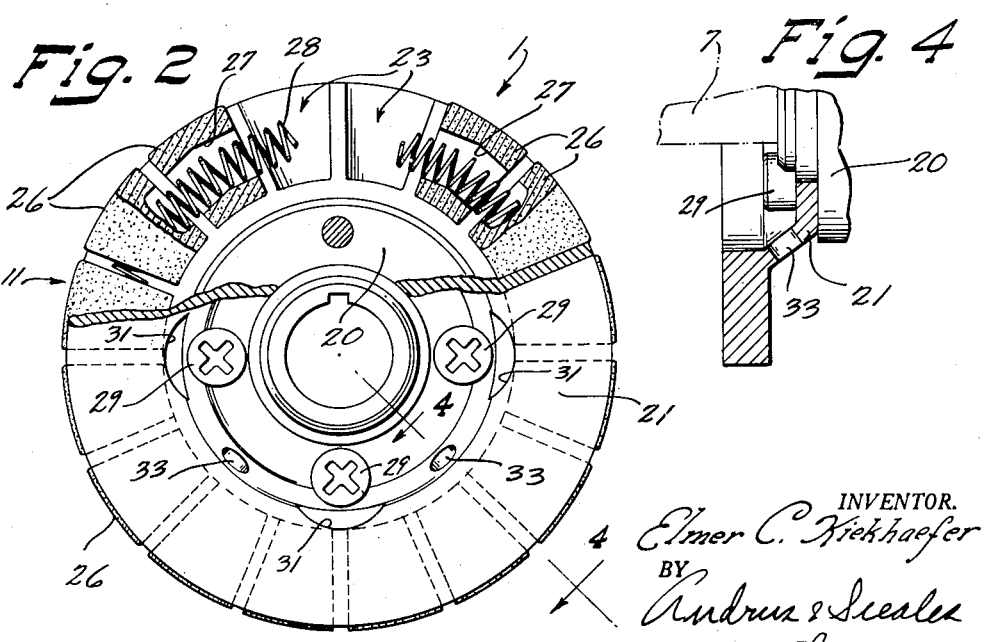
INVENTOR.
Elmer C. Kiekhaefer
BY
Andrus & Sceales
Attorneys

United States Patent Office 2,722,304
Patented Nov. 1, 1955

2,722,304
COOLING MEANS FOR CENTRIFUGAL CLUTCH UNIT

Elmer C. Kiekhaefer, Cedarburg, Wis.

Application August 4, 1952, Serial No. 302,481

2 Claims. (Cl. 192—113)

This invention relates to centrifugally operated friction clutches and particularly to the engagement of the friction members and cooling thereof.

The invention provides a series of friction shoes which are allowed limited axial movement by the end supporting means whereby limited shaft misalignment is accommodated by movement of the shoes relative to the retaining means.

The invention further provides an air circulating system around the friction members to cool the latter and the outside of the clutch unit to increase the capacity of the clutch.

An object of the invention is to allow the friction shoes to move relative to the driven member without effecting the driving engagement of the clutch.

Another object is to provide an improved centrifugally operated clutch of larger capacity within limited dimensions.

Another object is to provide a centrifugally operated clutch which operates without noise and vibration below the predetermined speed for clutch engagement.

Another object is to provide for the circulation of air around the friction areas and the friction surfaces at all speeds of operation including speeds below that for clutch engagement.

Another object is to provide for the removal of material worn from the friction members and otherwise carried within the clutch unit.

Another object is to provide a housing for the clutch which precludes airborne moisture and foreign particles from the clutch while allowing adequate access of air to the clutch members necessary for cooling the same.

These and other objects and advantages will appear in connection with the following description of an embodiment of the invention illustrated in the accompanying drawings.

In the drawings:

Fig. 1 is a transverse axial section taken through the clutch housing and clutch unit;

Fig. 2 is an end elevation of the driven clutch element with the clutch broken away and sectioned to show the friction shoes and retaining spring;

Fig. 3 is a side elevation of the drive clutch means shown in Fig. 1 with several of the friction shoes removed to show the retaining spring and end members; and Fig. 4 is a transverse section showing the location of the supplementary air entry ports for cooling the friction shoes.

The clutch unit 1 shown in the drawings is particularly adapted for chain saws such as that shown and described in the copending application of the inventor entitled Transmission Unit for Chain Saws, Serial No. 301,702, filed July 30, 1952.

The clutch housing 2 comprises the cylindrical outer member 3 formed integrally with the crank case 4 of the chain saw engine and the cover member 5 secured to the periphery of member 3 and formed integrally with the transmission case 6.

The projecting end of drive shaft 7 which extends into housing 2 is supported by the bearing 8 in crank case 4. The driven shaft 9 supported by the bearing 10 is carried by transmission case 6 and extends therefrom into housing 2 in end-to-end relation with shaft 7. The drive clutch element 11 is rotationally secured on the end of shaft 7 by the key 12 and fixed thereon by the bolt assembly 13 within housing 2. The driven clutch element comprises the drum 15 which is closed at one end 16 thereof and which is fixed on the splined end of shaft 9 by the bolt 14.

The interlocking annular flanges 17 and 18 of member 3 and cover 5, respectively, are adapted to be secured by the ring clamp 19 and normally secure transmission case 6 to crank case 4 of the chain saw unit. Loosening or removal of the ring clamp 19 allows cover 5 and transmission case 6 to be adjusted rotationally relative to member 3 and crank case 4 respecting the axis of shafts 7 and 9 for various conditions of chain saw operation. Removal of ring clamp 19 while the clutch is not being driven allows drum 15 to be withdrawn from housing 2 and the transmission case 6 to be detached from crank case 4 as desired, such as for the separate transporting of the respective parts of the chain saw unit.

The driving clutch element 11 includes the flanged hub 20 mounted directly on shaft 7 and the circular plates 21 secured by the bolts 22 to the opposite sides of hub 20. Each plate is formed with a series of radial slots 23 which open outwardly of the periphery of each plate. The ribs 24 between adjacent slots extend radially from the rim 25 of each plate 21 closing the inner end of the slots 23 of the plate. Each rim 25 is flared inwardly for securement by the bolts 22 to the hub 20 as described, and is oppositely offset to space slots 23 axially respecting shaft 9 and to receive the friction shoes 26.

Each shoe 26 comprises a block of suitable material of generally rectangular outline and of wedge-shaped cross-section generally corresponding to the area of slots 23 formed by rim 25 and the radially extending ribs 24. Each shoe or block 26 is provided with a transverse opening 27 between the ends thereof to receive the spring 28. Spring 28 extends circularly about the axis of shaft 7 through the openings 27 of blocks 26 as arranged radially and supported at opposite ends within slots 23.

At idling speeds, spring 28 is tensioned to secure blocks 26 radially inwardly and seat the ends thereof radially inwardly against the rim 25 of each plate 21. At higher speeds of shaft 7, spring 28 expands radially allowing blocks 26 to move radially outwardly by centrifugal force and into engagement with the inner face of drum 15. At such higher speeds, centrifugal force, measured by the angular velocity of spring 28 and blocks 27, maintains the blocks in frictional contact with drum 15 to drive the latter and effect the rotation of driven shaft 9. The torque effecting rotation of driven shaft 9 is transmitted from shaft 7 through ribs 24 against the ends of blocks 26.

In the operation of the clutch unit the angular misalignment of shafts 7 and 9 causes relative axial movement between drum 15 and the driving clutch element 11 with each rotation thereof. Such misalignment is unavoidable in actual service where the parts are separated and dismantled frequently and careful reassembly cannot be depended on.

According to the invention, a substantial clearance between the ends of the shoe blocks 26 and plates 21 is provided whereby limited axial movement of each block respecting plates 21 is permitted.

The clearance provided allows the blocks to move axially relatively to the plates and to remain in frictional engagement with the inner face of drum 15 whereby the engaging faces of the blocks and drum 15 are secured against frictional wear.

The invention additionally provides for the air-cooling of the blocks and drum interior by controlled recirculation of the air within the housing and the cooling of the drum exterior from the outside without allowing entry of dust and foreign particles to the housing.

In the driving clutch element 11, the milled cutaway portions 31 provide openings through rims 25 radially inwardly of the blocks 26 and normally provide clearance for the heads 29 and nuts 30 of bolts 22 by the additional openings 32, provided in the end 16 of drum 15. The milled cutaway portions 31 and openings 33 in plates 32 between bolts 22 provide for the circulation of air through the drum with rotation of clutch element 11 and blocks 26. During operation of the clutch or rotation of clutch element 11, element 11 acts as a fan which drives the air within drum 15 for discharge axially outwardly from the outer open end of the drum. Openings 32 and 33 in rims 25 of plates 21 and openings 32 in drum 15 provide for the admission of air to the blocks 26 between plates 21 to cool the blocks. The air passes by centrifugal force over the blocks radially outwardly against the inner face of drum 15 to carry small particles worn from the friction face of the blocks and remove them from the interior of the drum. The air discharged from the periphery of the drum passes between plate 21 adjacent to the end of crank case 4 and moves radially inwardly within housing 2. The series of flanges 34 may be provided within housing 2 at the end of crankcase 4 to extend radially of shaft 7 and to retard the rotational velocity of the air as it reaches the drum and effect thereby the greater circulation of the air inwardly toward openings 31 and 33.

The annular series of grooves formed in the outer periphery of drum 15 provide a series of fins 35 for the increased exposed cooling area of the outside of the drum. The openings 36 in housing member 3 adjacent to fins 35 and between the ends of drum 15 allow for the admission or exhaustion of limited amounts of air to or from within the housing with the expansion or contraction of the air therein and provide a constant circulation of air between fins 35 of the drum. A minimum operating clearance is provided between the outer dimension of fins 35 and the interior of housing member 3 whereby fins 35 serve to preclude the entry of foreign particles, such as dust and dirt entering housing 2 through openings 36 from reaching either end of housing 2 and the interior thereof and whereby the dependable operation of the clutch unit under conditions normally encountered in chain saw operation is provided. Normal breathing of the housing with contraction and expansion of the air therein is allowed without admission of foreign particles thereto. Limited exposure of drum 15 through openings 27 to the outside air is also provided thereby. With each rotation of drum 15 a certain amount of air between flanges 34 is expelled through openings 36 and is replaced by outside air which enters through the same or other openings and is carried about the interior of housing 3 to cool the latter and between fins 35 to cool the drum.

The desired maximum capacity of the clutch unit of limited size is provided by the adequate cooling of the clutch. The relative movement of the friction blocks provided for, increases the serviceability of the clutch unit and reduces the actual cooling requirements of the clutch.

Various embodiments of the invention may be employed within the scope of the following claims.

I claim:

1. In a centrifugally operated clutch transmission unit for chain saws and the like, a cylindrical housing having an end wall, a drive shaft rotatably supported by said end wall and projecting centrally into said housing, a drum rotatably supported within said housing and concentrically of said drive shaft, a series of friction blocks radially arranged within said drum and adapted to engage the latter, and a drive member fixed to said drive shaft within said drum and having radial ribs supporting said blocks to rotate the same and effect the rotation of the drum, said drive member having openings adjacent said end wall whereby the rotation of said drive member effects the circulation of air through the interior of the drum and between said end wall and said drive member for transfer of heat to said end wall, a series of annular fins extending about said drum and formed integrally therewith and having an outer dimension sufficient to provide a minimum operating clearance with the interior of said housing, and a series of openings in said housing exposing portions of said drum and said fins for the circulation of air therethrough and between said fins to cool the exterior of said drum separately of the circulation of cooling air through the interior thereof and to provide for the cooling of said end wall by the transfer of heat therefrom to the housing cooled by the rotation of the drum.

2. In a centrifugally operated clutch transmission unit for chain saws and the like, a cylindrical housing having opposite end walls, drive and driven shafts rotatably supported in approximate alignment within said housing and in end-to-end relation, a drum having a supporting end fixed to said driven shaft and a series of annular fins extending about said drum and formed integrally therewith and having an outer dimension sufficient to provide a minimum operating clearance with the interior of same, a series of friction blocks radially arranged within said drum and adapted to engage the latter, and a drive member fixed to said drive shaft within said drum and having radial ribs supporting said blocks to rotate the same and effect the rotation of the drum, said drive member and drum having openings adjacent the corresponding end walls of said housing and disposed radially inwardly of said blocks for the circulation of air through the interior of the drum and in heat exchange relation with the corresponding end walls, and a series of openings in said housing exposing portions of said drum and said fins for the circulation of air therethrough and between said fins to cool the exterior of said drum separately of the circulation of cooling air through the interior thereof and to provide for the cooling of said end walls by the transfer of heat therefrom to the cylindrical housing cooled by the rotation of the drum.

References Cited in the file of this patent

UNITED STATES PATENTS

| 1,866,291 | Bryson | July 5, 1932 |
| 1,971,929 | Burdick | Aug. 28, 1934 |
| 2,000,713 | Norris | May 7, 1935 |
| 2,487,936 | McCrady et al. | Nov. 15, 1949 |
| 2,504,177 | Bruestle | Apr. 18, 1950 |

FOREIGN PATENTS

| 64,274 | Sweden | Dec. 13, 1926 |
| 240,449 | Great Britain | Sept. 18, 1925 |
| 303,149 | Great Britain | Feb. 21, 1930 |
| 470,912 | Great Britain | Aug. 24, 1933 |
| 828,455 | France | Feb. 14, 1938 |